March 15, 1966   J. M. J. VARGA   3,240,148
PRESSURE ROLLERS
Filed Oct. 23, 1963   6 Sheets-Sheet 1
-FIG. 1.-
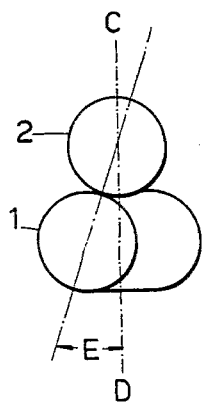
-FIG. 3.-
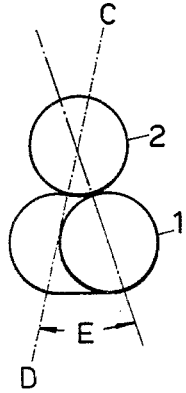
-FIG. 2.-
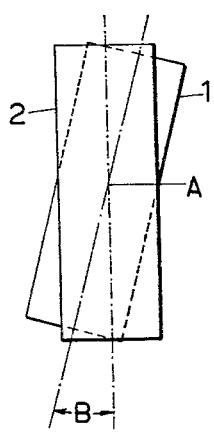
-FIG. 4.-
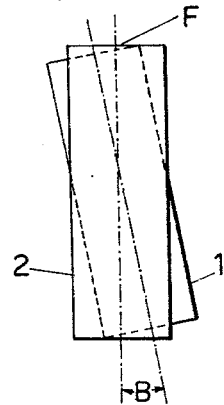
INVENTOR:
John M. J. Varga,
BY
Pierce, Scheffler & Parker
his Attorneys

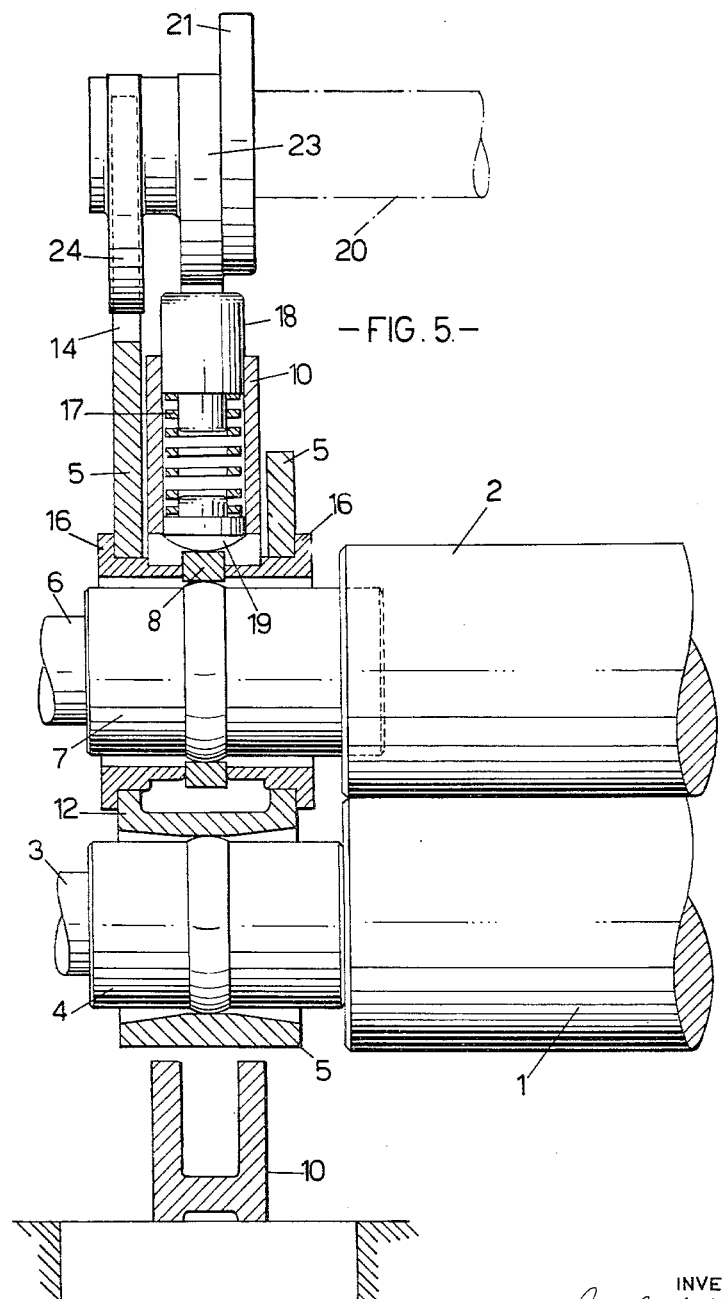

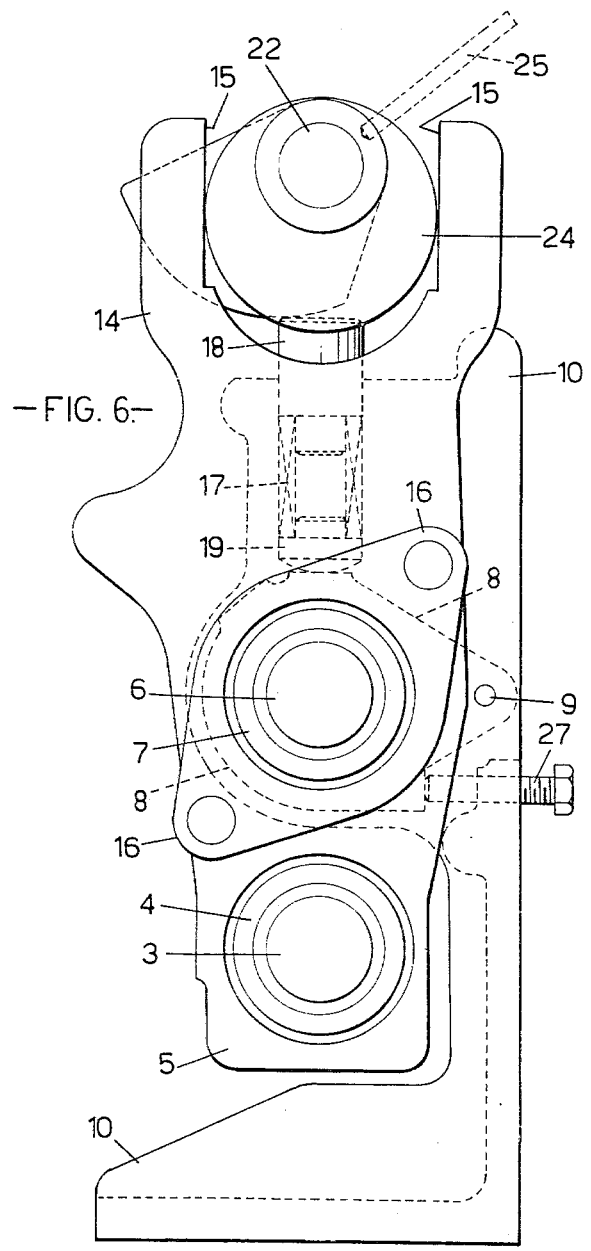

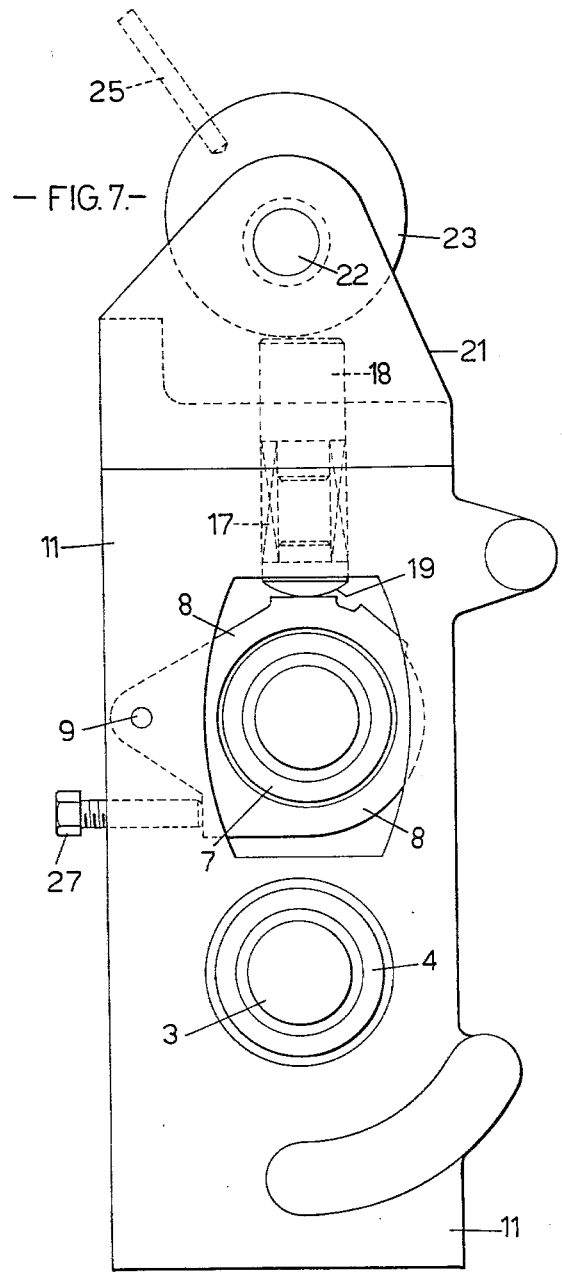

March 15, 1966  J. M. J. VARGA  3,240,148
PRESSURE ROLLERS

Filed Oct. 23, 1963  6 Sheets-Sheet 5

INVENTOR:
John M. J. Varga,
BY
Pierce, Scheffler & Parker
his Attorneys

March 15, 1966    J. M. J. VARGA    3,240,148
PRESSURE ROLLERS
Filed Oct. 23, 1963    6 Sheets-Sheet 6
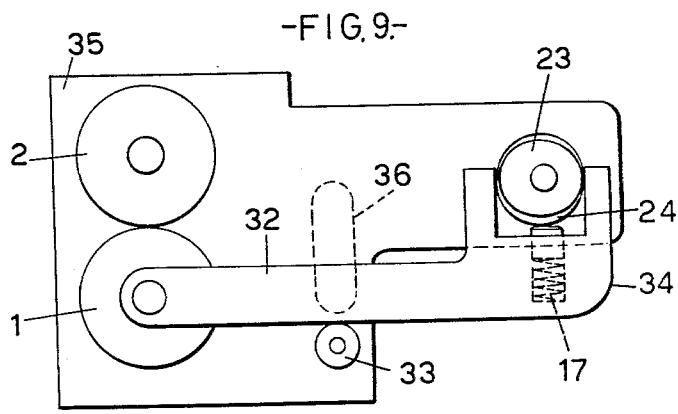
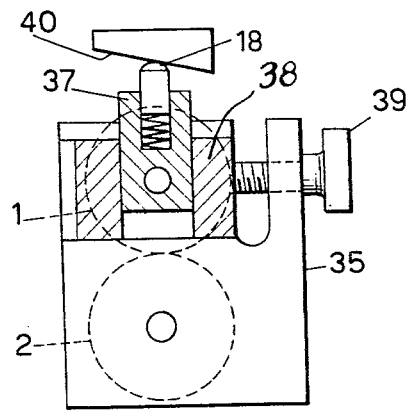
INVENTOR:
John M. J. Varga,
BY
Pierce, Scheffler & Parker
his Attorneys

United States Patent Office 3,240,148
Patented Mar. 15, 1966

3,240,148
PRESSURE ROLLERS
John M. J. Varga, Toronto, Ontario, Canada, assignor to Carding Specialists (Canada) Limited, Toronto, Ontario, Canada, a corporation of Canada
Filed Oct. 23, 1963, Ser. No. 318,361
Claims priority, application Great Britain, Oct. 26, 1962, 40,559/62
5 Claims. (Cl. 100—158)

This invention relates to pressure roller assemblies and particularly those for use in the textile industry for applying pressure to webs passing therebetween for known purposes. Moreover, the invention relates to the type of pressure roller assembly wherein one roller is mounted in relation to the other so that the axes of the rollers cross one another at a predetermined angle.

It is known that by crossing pressure rollers and applying a pressure to one of them at its ends an even distribution of pressure along the length of the rollers can be obtained. It is also considered that for a particular angular off-setting of the axes of the rollers a given pressure is required if ideal contact between the rollers is to be obtained.

It is the main object of the present invention to provide an improvement in regard to pressure and off-setting relationship.

Accordingly, there is provided a method of adjusting the relationship between a pair of rollers of a roller assembly, consisting in mounting at least one roller to be capable of angular off-setting adjustment in relation to the other roller by the operative movement of at least one end of the roller and mounting one roller to be movable bodily towards and away from the other roller, and causing predetermined adjustment at said end to give the angular relationship between the axes of said rollers and a predetermined pressure between the rollers to obtain simultaneously.

The invention includes a roller assembly comprising a pair of rollers mounted in bearings at their ends and arranged so that at least one of said rollers can pivot in the plane of its axis, at least one end of said roller being supported in means capable of adjustment to cause pivotal off-setting movement of said roller, one of said rollers being mounted in such a manner as to be bodily movable in relation to the other roller for the creation of pressure between the rollers, and operating means for causing said off-setting adjustment of said supporting means and further means for combined operation for applying a predetermined pressure between the rollers in direct relation to the off-set adjustment.

The invention will now be more particularly described with reference to the accompanying drawings in which:

FIG. 1 is a diagrammatic end view of a pair of rollers capable of angular adjustment in relation to one another about both ends of one roller;

FIG. 2 is a plan view of FIG. 1;

FIG. 3 is a diagrammatic end view of a pair of rollers with one roller adjustable about one end;

FIG. 4 is a plan view of FIG. 3;

FIG. 5 is a part sectional front view of one end of the roller mountings according to FIGS. 3 and 4;

FIG. 6 is an end view of FIG. 5;

FIG. 7 is an end view of the opposite ends of these rollers;

FIG. 9 is a view showing the modified cam adjusting means; and

FIG. 10 is a part sectional view showing slide bearings with screw and cam adjustment.

Figure 8:
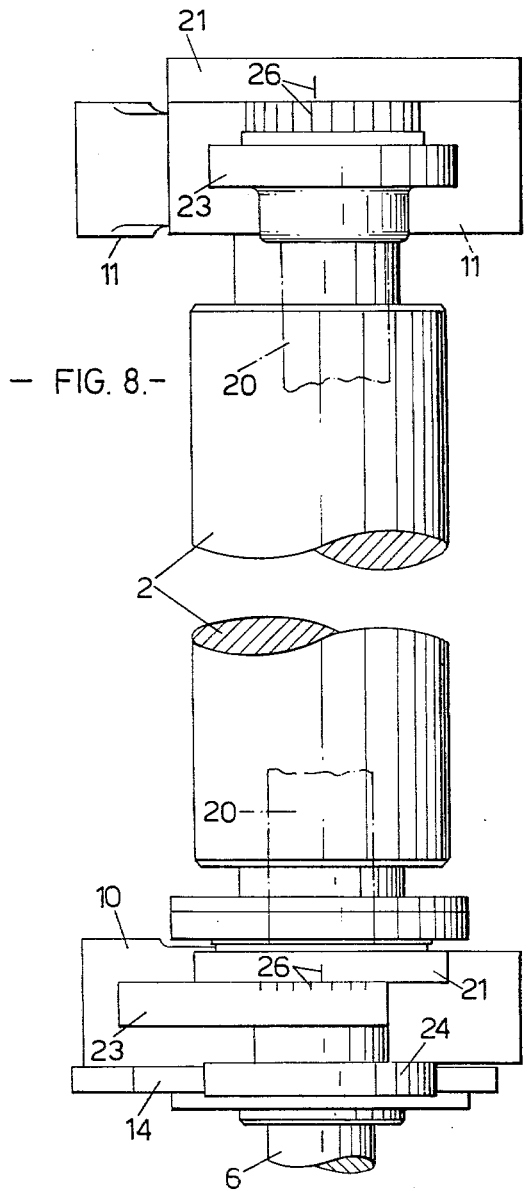
FIG. 8 is a plan view of this roller assembly.

The invention can be applied, as indicated diagrammatically in exaggerated form in FIGS. 1 and 2, at each end of the rollers 1 and 2 which cross one another about a center point A with B showing the variable angle of adjustment of roller 1 in relation to roller 2 and E the maximum angular movement from the vertical line C, D. The adjustment of the roller 1 is about the axis of roller 2 and equal at both ends. Simultaneously, with this movement, pressure between the two rollers is varied in direct relationship to the angular adjustment.

Alternatively, FIGS. 3 and 4 shown in a similar way to the above, an arrangement wherein the two rollers have an angular relationship by adjustment of roller 1 about one end. In this instance the normal line C, D at the pivotal end F of the rollers is inclined from the vertical and thus in plan the rollers (when set to a given adjustment) in effect cross one another at an intermediate point. Again the angular adjustment E is about the axis of roller 2 as before. It will be understood the line C, D may be vertical.

In one production form of pressure roller assembly, a first roller 1, the lower of two superposed rollers 1, 2, has each of its ends 3 mounted in a swivel bearing 4. One of such bearings is mounted in the lower end of a pivotal end frame 5 whose pivotal axis is that of the second (upper) roller 2. The ends 6 of this second roller 2 are supported in swivel bearings 7 mounted in carrier brackets 8 which are pivoted at 9 to main fixed end frames 10, 11 so as to be capable of movement relative to the other first roller 1. Conveniently, the pivotal end frame 5 comprises a pair of spaced plate-like parts joined by an integral lower sleeve 12 which receives the bearing 4 for the first roller 1. The upper end 14 of the outermost plate is extended and forked to form the parallel bearing faces 15. This frame 5 is pivotal about the axis of roller 2 by means of a pair of axially aligned flanged bearings 16 which are secured to the inner and outer plate-like parts of frame 5 and have their inner ends rotatable in the fixed frame 10. The bearings 16 have a bore suitable to give clearance for movement of the swivel bearing 7 and the bracket 8 lies with slight clearance for movement between these bearings. The fixed frame 10 carries a coiled spring 17 (Belleville spring washers in a telescopic or other housing may be used) having a top plunger 18 and a bottom stud 19 (a ball bearing may be used) interposed between such spring and the bracket 8 for bearing 7. Brackets 21 are secured on top of the two fixed end frames 10, 11, for short stub shafts 22 which are used to carry a pair of cams 23. Alternatively these cams are secured on a shaft 20. One other cam 24 (or an eccentric) forms part of or is secured to one cam 23 to move therewith and lies in the forked end 14 of the pivotal frame 5. The other cams 23 engage the aforesaid plungers 18 of the springs 17. Operating means such as a lever or tommy bar 25 is provided for turning said shaft 20 about its axis, or the cams 23, 24 together and cam 23 separately.

With the above arrangement the cams can be turned so that the frame operating cam 24 will rock the pivotal frame 5 and thus move the end 3 of the first (lower) roller 1 until its axis is at a predetermined angle in relation to the axis of the other roller 2. Indicator means 26 are furnished for facilitating the setting of this angularity. Rotation of the shaft 20 (when used) automatically moves the two cams 23 with cam 24. Alternatively, one cam 23 is operated directly with cam 24 and then the other cam 23 is moved. Cams 23 operate the spring means 17, 18, 19 and thus apply pressure to the two ends of the second (upper) roller 2. It will be understood that the profiles of the second pair of cams 23 can be calculated to give a desired relative pressure to suit the angular setting.

It is customary to furnish the two rollers 1 and 2 with scraper means and the scraper for roller 1 can be carried by two frames mounted on the roller shaft ends. The top scraper is carried by the fixed frames 10, 11. Thus any relative setting or pressure of the scraper blades to the rollers will not be affected by the setting of the rollers.

Means are furnished for moving the second roller 2 in relation to the first roller 1 for lifting it out of engagement when the roller axes are parallel, or may be when crossed. This movement may be such that there is a predetermined gap between the roller peripheries. As shown, the pivoted bracket 8 at each end of the roller can be moved and set by the set screw 27. This arrangement ensures that if so desired the roller assembly could be used for dealing with a web of synthetic fibres or when it is desired to apply some control to a web of fibers without wishing to crush them, or to apply light pressure or when it is desired to completely separate the two rollers. The gap between the rollers may be in the order of a few thousandths of an inch.

As indicated in FIGS. 1 and 2 the rollers may have angular relationship by moving both ends of roller 1. In this case the ends of the two rollers will be identical in their mountings, i.e., there will be two pivotal frames 5 and associated cams 23, 24 at each end.

It will be understood that the construction may be modified in various ways and if desired the roller that is adjusted for angularity may also be adjustable in regard to variation of pressure. For example, as shown in FIG. 9 one of the rollers may be carried at least at one of its ends by a pivoted lever 32 mounted on a roller 33 and forming part of an end frame 34. Such lever and frame is supported by fixed end frame 35 which provides the bearings for the other roller 2. The aforesaid spring 17 is carried by the pivoted end frame 34 and acts to pivot the lever 32 about the roller 33. Again the pivoted end frame 34 is forked for the cam 23 (or eccentric) to operate it and cause lever 32 to ride on the roller and thus give angular adjustment to the roller. Further cam means 24 are provided for operating the spring means 17 as aforesaid. It will be understood that both ends of roller 1, may be adjustable in the manner for offsetting independently or simultaneously. Again the pressure offsetting is applied with inter-related movement. The roller 33 may be replaced by a pivoted link 36.

In a modified construction, FIG. 10, a first roller 1 is mounted in bearings 37 slidably provided in slide block 38 (at least at one end) which is mounted for lateral displacement such as by screw 39 (cam or eccentric operating means may be used) for giving the required amount of adjustment for offsetting said first roller 1 in relation to a second roller 2. In this construction the said end bearings 37 are mounted with spring loaded plungers 18 in engagement with cam tracks 40 comprising inclined faces. Thus such bearings 37 are moved and presure variation will take place automatically in combination to a predetermined degree. It will be understood that such inclined faces may be fixed or adjustable.

What we claim is:

1. Pressure roller assembly, comprising a pair of co-operating rollers, each roller being mounted for rotation in end bearings, supporting frames for said bearings, said end bearings of at least one of said rollers being mounted for said roller to be movable bodily in relation to the other roller, first cam means for adjusting the roller mountings for setting the pressure between said rollers, end frames carrying the said end bearings of one of said rollers for allowing an off-setting movement of said one roller and thus crossing the axes of the rollers, the frame for one end of said one roller being mounted to pivot about the axis of the other roller for the angular off-setting adjustment, second cam means for operating at least one of the frames and thus setting the angularity of the crossing, said two cam means being furnished with corelated profiles of predetermined shape and having common operating means so as to provide a predetermined pressure between the rollers in direct relation to the off-set adjustment.

2. Pressure roller assembly, comprising a pair of co-operating rollers, each roller being mounted for rotation in end bearings, supporting frames for said bearings, said end bearings of at least one of said rollers being mounted for said roller to be movable bodily in relation to the other roller, first cam means for adjusting the roller mountings for setting the pressure between said rollers, said first cam means applying pressure to the two ends of one roller through spring means which are operated by said cam means, end frames carrying the said end bearings of one of said rollers for allowing an offsetting movement of said roller and thus crossing the axes of the rollers, second cam means for operating at least one of the frames and thus setting the angularity of the crossing, said two cam means being furnished with co-related profiles of predetermined shape and having common operating means so as to provide a predetermined pressure between the rollers in direct relation to the off-set adjustment.

3. Pressure roller assembly, comprising a pair of co-operating rollers, each roller being mounted for rotation in end bearings, supporting frames for said bearings, said end bearings of at least one of said rollers being mounted in pivoted brackets for said roller to be movable bodily in relation to the other roller, first cam means for adjusting said pivoted brackets for setting the pressure between said rollers, and frames carrying the said end bearings of one of said rollers for allowing an off-setting movement of said roller and thus crossing the axes of the rollers, second cam means for operating at least one of the frames and thus setting the angularity of the crossing, said two cam means being furnished with co-related profiles of predetermined shape and having common operating means so as to provide a predetermined pressure between the rollers in direct relation to the off-set adjustment.

4. Pressure roller assembly, comprising a pair of co-operating rollers, each roller being mounted for rotation in end bearings, supporting frames for said bearings, said end bearings of at least one of said rollers being mounted for said roller to be movable bodily in relation to the other roller, first cam means for adjusting the roller mountings for setting the pressure between said rollers, end frames carrying the said end bearings of one of said rollers for allowing an off-setting movement of said roller and thus crossing the axes of the rollers, said end frames being pivoted for swinging adjustment about the axis of the other roller so that said roller will be moved for its axis to cross the axis of the other roller at a predetermined angle at a common intermediate point in the length of the rollers, second cam means for operating at least one of the frames and thus setting the angularity of the crossing, said two cam means being furnished with co-related profiles of predetermined shape and having common operating means so as to provide a predetermined pressure between the rollers in direct relation to the off-set adjustment.

5. A roller assembly comprising in combination a pair of co-operating rollers mounted in bearings at their ends to rotate about their respective axes, at least one end of at least one of said rollers being supported in carrier means capable of adjustment to cause lateral offsetting movement for said roller end in relation to the axis of said other roller, one of said rollers being mounted in such a manner as to be bodily adjustable in relation to the other roller for the creation of pressure between the rollers, first cam means for adjusting the roller mountings for setting the pressure between said rollers, second cam means for simultaneously operating said roller end carrier means to move its roller end laterally and thus set the angular relationship between the axes of the two rollers whilst the simultaneous operation maintains contact between their peripheries, said two cam means being furnished with co-related profiles of predetermined shape and having common operating means so as to provide a predetermined pressure between the rollers simultaneously with and in direct relation to the off-set adjustment.

References Cited by the Examiner

UNITED STATES PATENTS

| 179,121 | 6/1876 | Mackh | 68—257 X |
| 2,180,046 | 11/1939 | Gleissner. | |
| 2,762,295 | 7/1956 | Varga et al. | 100—158 |
| 2,965,920 | 12/1960 | Whittum | 18—2 |

WALTER A. SCHEEL, *Primary Examiner.*

LOUIS O. MAASSEL, *Examiner.*